(12) United States Patent
Yang (10) Patent No.: US 11,129,693 B2
(45) Date of Patent: Sep. 28, 2021

(54) METHODS OF IMPROVING DENTAL RESTORATION MARGINS AND ARTICLES

(71) Applicant: 3M INNOVATIVE PROPERTIES COMPANY, St. Paul, MN (US)

(72) Inventor: Jie Yang, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 133 days.

(21) Appl. No.: 16/327,214

(22) PCT Filed: Sep. 5, 2017

(86) PCT No.: PCT/US2017/050029
§ 371 (c)(1),
(2) Date: Feb. 21, 2019

(87) PCT Pub. No.: WO2018/048777
PCT Pub. Date: Mar. 15, 2018

(65) Prior Publication Data
US 2019/0231475 A1 Aug. 1, 2019

Related U.S. Application Data

(60) Provisional application No. 62/383,885, filed on Sep. 6, 2016.

(51) Int. Cl.
*A61C 5/00* (2017.01)
*A61C 13/107* (2006.01)
(Continued)

(52) U.S. Cl.
CPC ................ *A61C 5/007* (2013.01); *A61C 5/20* (2017.02); *A61C 5/30* (2017.02); *A61C 13/0001* (2013.01)

(58) Field of Classification Search
CPC .. A61C 5/007; A61C 5/20; A61C 5/30; A61C 13/0001
See application file for complete search history.

(56) References Cited

U.S. PATENT DOCUMENTS 2,474,676 A * 6/1949 Kelly .................... A61C 13/081
264/20
3,541,688 A * 11/1970 Hughes ..................... A61C 5/77
433/208
(Continued)

FOREIGN PATENT DOCUMENTS

| CA | 1059803 | 8/1979 |
| CN | 101695447 | 8/2011 |

(Continued)

OTHER PUBLICATIONS

Matijevic, Surface and Colloid Science, vol. 6, 1973.
(Continued)

*Primary Examiner* — Nicholas D Lucchesi
(74) *Attorney, Agent, or Firm* — 3M Innovative Properties Company (57) ABSTRACT

A method is provided for placing a preformed dental article. The method comprises: providing a preformed dental article; providing an uncured self-supporting dental article having a first shape, wherein the uncured dental article comprises: a polymerizable resin system; at least 50 wt-% of filler; placing the preformed dental article onto a tooth structure such that the uncured dental article is provided at an interface between the preformed dental article and tooth structure; and forming the uncured dental article into a second shape thereby improving the continuity of the interface. Further, a dental article for use at an interface between a dental restoration and tooth structure having a first self-supporting shape are provided in accordance with the invention.

17 Claims, 3 Drawing Sheets

(51) Int. Cl.
*A61C 5/20* (2017.01)
*A61C 5/30* (2017.01)

(56) References Cited

U.S. PATENT DOCUMENTS

| | | | |
|---|---|---|---|
| 3,986,261 A * | 10/1976 | Faunce | A61C 5/00 |
| | | | 433/217.1 |
| 4,376,673 A * | 3/1983 | Cheung | A61K 6/40 |
| | | | 216/96 |
| 4,503,169 A | 3/1985 | Randklev | |
| 4,642,126 A | 2/1987 | Zador | |
| 4,652,274 A | 3/1987 | Boettcher | |
| 4,695,251 A | 9/1987 | Randklev | |
| 4,822,279 A | 4/1989 | Greggs | |
| 5,120,223 A | 6/1992 | Weissman | |
| 5,403,188 A * | 4/1995 | Oxman | A61C 13/087 |
| | | | 433/218 |
| 5,545,676 A | 8/1996 | Palazzotto | |
| 6,030,606 A | 2/2000 | Holmes | |
| 6,572,693 B1 | 6/2003 | Wu | |
| 6,624,211 B2 | 9/2003 | Karim | |
| 6,652,280 B2 * | 11/2003 | Cohen | A61Q 11/00 |
| | | | 433/217.1 |
| 6,709,694 B1 | 3/2004 | Suttor | |
| 6,730,156 B1 | 5/2004 | Windisch | |
| 6,899,948 B2 | 5/2005 | Zhang | |
| 7,255,562 B2 | 8/2007 | Rusin | |
| 7,674,850 B2 | 3/2010 | Karim | |
| 7,811,486 B2 | 10/2010 | Karim | |
| 7,816,423 B2 | 10/2010 | Karim | |
| 8,445,558 B2 | 5/2013 | Karim | |
| 8,906,981 B2 | 12/2014 | Yang | |
| 8,979,536 B2 | 3/2015 | Jones | |
| 9,044,292 B2 | 6/2015 | Velamakanni | |
| 9,370,404 B2 | 6/2016 | Velamakanni | |
| 10,751,147 B2 * | 8/2020 | Yang | A61C 5/77 |
| 2003/0203339 A1 * | 10/2003 | Chilibeck | A61C 5/70 |
| | | | 433/218 |
| 2005/0100868 A1 * | 5/2005 | Karim | A61C 13/081 |
| | | | 433/218 |
| 2007/0196792 A1 * | 8/2007 | Johnson | A61C 5/30 |
| | | | 433/218 |
| 2008/0293018 A1 * | 11/2008 | Karim | A61C 13/087 |
| | | | 433/202.1 |
| 2009/0305195 A1 * | 12/2009 | Jones | A61C 13/20 |
| | | | 433/219 |
| 2009/0305196 A1 | 12/2009 | Karim | |
| 2010/0062394 A1 | 3/2010 | Jones | |
| 2012/0295227 A1 | 11/2012 | Bowman | |
| 2013/0130203 A1 | 5/2013 | Velamakanni | |
| 2013/0137064 A1 | 5/2013 | Velamakanni | |
| 2013/0341812 A1 | 12/2013 | Schechner | |
| 2014/0162216 A1 | 6/2014 | Craig | |

FOREIGN PATENT DOCUMENTS

| | | |
|---|---|---|
| EM | 001457089 | 5/2017 |
| EM | 001457097 | 5/2017 |
| EP | 2008636 | 12/2008 |
| WO | WO 2006-020760 | 2/2006 |
| WO | WO 2008-008288 | 1/2008 |
| WO | WO 2011-050561 | 5/2011 |
| WO | WO 2011-126647 | 10/2011 |
| WO | WO 2015-088976 | 6/2015 |

OTHER PUBLICATIONS

Newsome, "Improving Your Margins," International Dentistry SA vol. 11, No. 6, (Date unknown but believed to be prior to the date of the filing of the present application.) pp. 36-42.

Pallav, "Wear Rates of Composites, an Amalgam, and Enamel, Under Stress-Bearing Conditions," The Journal of Prosthetic Dentistry, Apr. 1988, vol. 59, No. 4, pp. 426-429.

Watts, "Determination of Polymerization Shrinkage Kinetics in Visible-Light-Cured Materials: Methods Development," Dental Materials, Oct. 1991, pp. 281-286.

International Search Report for PCT International Application No. PCT/US2017/050029, dated Dec. 8, 2017, 7 pages.

* cited by examiner

*Fig. 6b*

METHODS OF IMPROVING DENTAL RESTORATION MARGINS AND ARTICLES

BACKGROUND

U.S. Pat. Nos. 7,674,850 and 7,816,423 describe compositions, particularly for forming dental products, having a hardenable self-supporting structure with sufficient malleability to be subsequently customized into a second shape and then hardened, and methods.

US2009/0305196 describes dental compositions that include a polymerizable component and an organogelator. In certain embodiments, the hardenable composition can be in the form of a hardenable, self-supporting (i.e., free-standing) structure having a first shape. The self-supporting structure has sufficient malleability to be reformed into a second shape, thereby providing for simplified customization of a device, e.g., simplified customized fitting of a dental prosthetic device. Once reformed into a second shape, the composition can be hardened using, for example, a free radical curing mechanism under standard photopolymerization conditions to form a hardened composition with improved mechanical properties.

U.S. Pat. No. 8,906,981 describes curable dental compositions, dental articles, and methods of making or using such compositions or articles. In one embodiment, the curable dental restoration composition comprises a resin system comprising a free-radically polymerizable semi-crystalline resin having a molecular weight no greater than 2000 g/mole and at least 50 wt-% of nanocluster filler.

SUMMARY

Although various curable dental restoration compositions and preformed dental articles have been described; industry would find advantage in new methods and articles particularly well-suited for dental margins.

In one embodiment, a method of placing a preformed dental article is described comprising providing a preformed dental article; providing an uncured self-supporting dental article having a first shape; placing the preformed dental article onto a tooth structure such that the uncured dental article is provided at an interface between the preformed dental article and the tooth structure; and forming the uncured dental article into a second shape thereby improving the continuity of the interface.

In another embodiment, a method of repairing a dental restoration of a tooth structure is described comprising providing an uncured self-supporting dental article at a surface of the tooth structure proximate a dental restoration and forming the uncured dental article into a second shape thereby improving the continuity of at least an interface between the tooth structure and dental restoration.

The uncured self-supporting dental article typically comprises a polymerizable resin system and at least 50 wt-% of filler.

In each of these methods, the article is subsequently cured and bonded to the tooth structure.

DETAILED DESCRIPTION OF PREFERRED EMBODIMENTS OF THE INVENTION

All dental restorations have "margins", i.e. an interface between the (i.e. hard) tooth structure and the restoration material (e.g. filling) or article (e.g. crown). For a margin to be considered "good" a minimal gap is present between the restoration and the tooth structure. Preferably, the margin of the restoration is continuous with the underlying tooth structure.

Figure 1:
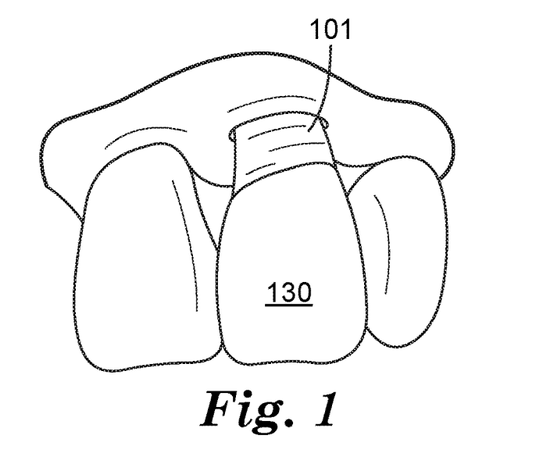
FIG. 1 is a perspective view of an embodiment of an unaesthetic restoration having a poor margin.

As illustrated in FIG. 1, one type of "poor" margin results when the tooth structure is not completely covered, resulting in a portion of the tooth not in contact with the crown or veneer. This is commonly referred to as an under extended margin. Another type of inadequate margin is one that is termed "open". This means that there is too large of a gap between the restoration and the underlying tooth structure such that the margin in not adequately sealed. This can be significant since many traditional types of dental cement can slowly wash out when exposed to the oral environment. Teeth with poor margins often do not have the appearance of natural teeth and can be more prone to decay due to exposure or inadequate sealing.

The present invention concerns methods of use of an uncured self-supporting dental article at an interface between a dental restoration (e.g. filling or crown) and tooth structure. The interface may also be characterized as a dental margin.

The uncured dental article comprises a (e.g. free-radically) polymerizable resin comprising a semi-crystalline resin and a filler. The (e.g. free-radically) polymerizable resin comprises one or more polymerizable monomers, oligomers, and/or polymers.

The term "self-supporting" means that the uncured dental article or composition thereof is dimensionally stable and will maintain its (i.e. first) shape without significant deformation at room temperature (i.e., about 20° C. to about 25° C.) for at least about two weeks when free-standing (i.e., without the support of packaging or a container). The uncured dental article or composition thereof are typically dimensionally stable at room temperature for at least about one month, three months, or six months. In some embodiments, the uncured dental article or composition thereof is dimensionally stable at temperatures above room temperature, such as up to about 40° C., 50° C., or 60° C. This definition applies in the absence of hardening or in other words curing the polymerizable resin system and in the absence of an external force other than gravity.

The uncured dental (e.g. margin) article can have various (first) sizes and shapes. In favored embodiments, the size and shape of the dental article is selected to facilitate the use thereof at a dental margin. For example, the first shape typically comprises a thin elongated structure, such as a rope or ribbon, or an annular ring. The first shape typically has a thickness ranging from 0.5 to 2 mm. The first shape can have various cross-sections including for example circular inclusive of oval as well are various three, four or five-sides geometric shapes such as rectangular, U-shaped, or trapezoidal. The cross-sectional shape has a width orthogonal to the thickness. The width ranges from about 1, 1.5 or 2 mm to about 5 mm. The first shape can have various lengths (the length being the maximum dimension) ranging from the length of a single face of a tooth (e.g. about 5 mm) up to the length of the circumference of a tooth (e.g. up to 20 or 25 mm) near the gumline. In some embodiments, the length may be substantially greater than what is utilized during a single repair or dental article (e.g. crown) placement. In this embodiment, the dental practitioner would cut off a piece of suitable length. Thus, the length of the uncured dental (e.g. margin) article is not limited and can range up to a decimeter, a meter, or several meters as in the case of a "tape" article.

The uncured dental (e.g. margin) article can be shaped (e.g., molded) into a variety of (e.g. first) shapes. The composition can be shaped (to form a first shape) in a variety of ways including, for example, extruding, injection molding, compression molding, thermoforming, vacuum forming, pressing, calendering, and web processing using rollers. Typically, a semi-finished (e.g. O-ring) shape is formed by extrusion through an orifice using a mold with a positive and negative impression. The O-ring typically has a slit to facilitate placement and adjustment of the size.

The uncured dental (e.g. margin) article can be prepackaged either individually or as an ensemble. Such packaging material generally protects the articles from conditions that would activate the initiator system and thus cause premature hardening, e.g., such as could result from exposure to light in the case of a photoinitiator. In addition, the packaging material also typically protects the article from damage during shipping as well as contact with water.

The uncured dental article is also typically sufficiently malleable such that it can be formed into a second shape under a moderate force i.e., a force that ranges from light finger pressure to that applied with manual operation of a small hand tool, such as a dental composite instrument.

The forming of the uncured dental article into a second shape can occur while the uncured dental article is in a patient's mouth, while on a typodont model, or a combination thereof. The temperature at which the uncured dental (e.g. margin) article having the first shape is formed into a second shape typically ranges from about 15° C. to 38° C. or about 20° C. to 38° C., or at room temperature. The second shape can be characterized as a customized shape that improves the continuity at the interface and aesthetic appearance.

Figure 2:
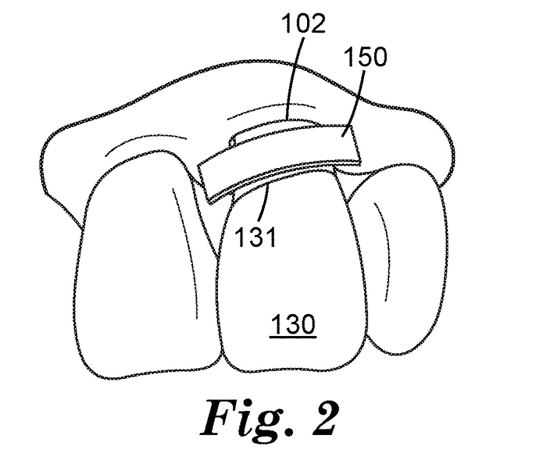
FIG. 2 is a perspective view of an embodiment of providing a dental article at an interface between a dental restoration and tooth structure.
Figure 3:
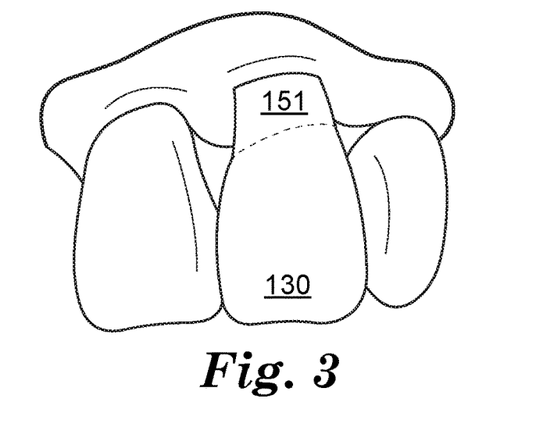
FIG. 3 is a perspective view of an embodiment of the dental article formed into a second shape improving the continuity of the interface.

In one embodiment, the uncured dental article can be used for repairing a (pre-existing) dental restoration of a tooth structure. For example, FIGS. 1-3 depict a method of repairing a dental restoration of a tooth structure. FIG. 1 depicts one type of "poor" margin that results when the tooth structure is not completely covered, resulting in a portion of the tooth structure 101 not in contact with a dental restoration 130, such as a crown or veneer. FIG. 2 depicts providing an uncured self-supporting dental article at a surface of the tooth structure proximate the dental restoration. The uncured dental article can have various shapes as previously described. In FIG. 2, the uncured dental (e.g. margin) article 150 has a (first) ribbon shape. The first shape has a length longer than the length of the underlying tooth structure. The first shape also is thicker than the dental restoration at the interface 131 between the uncured dental article 150 and tooth structure 101. In this embodiment, the uncured dental article 150 is placed at a central region of the exposed tooth structure. Thus, there is exposed tooth structure between the interface 131 and the uncured dental article 150 and also exposed tooth structure between the adjacent gum line 102 and the uncured dental article 150. However, the uncured dental article may be placed such that there is only exposed tooth structure at one of such locations rather than both.

The method further comprises forming the uncured dental article into a second shape 151. The forming of the uncured dental article into a second shape can be done by a variety of methods including applying pressure with fingers or an instrument of choice (e.g., hand operation of dental composite instrument), trimming, cutting, sculpting, grinding, etc.

The second shape improves the continuity at least at the interface 131 between the tooth structure and restoration thereby sealing the margin. The second shape 151 may also substantially cover the exposed tooth structure 101 terminating at or near the gumline 102, as depicted in FIG. 3. Thus, the second shape can also improve the aesthetic appearance.

Figure 4A:
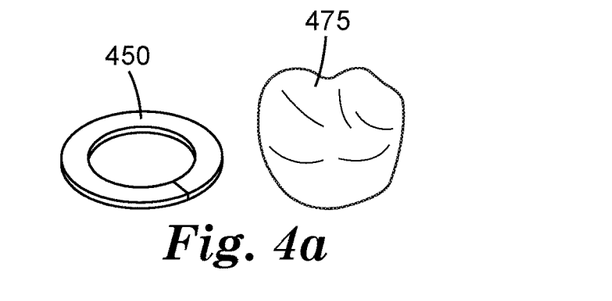
FIGS. 4a-4d are a schematic of an embodied method of placing a preformed dental crown article utilizing a dental article.
Figure 4B:
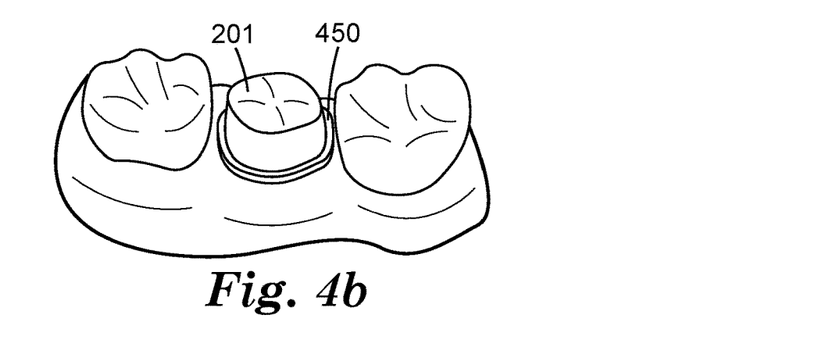
Figure 4C:
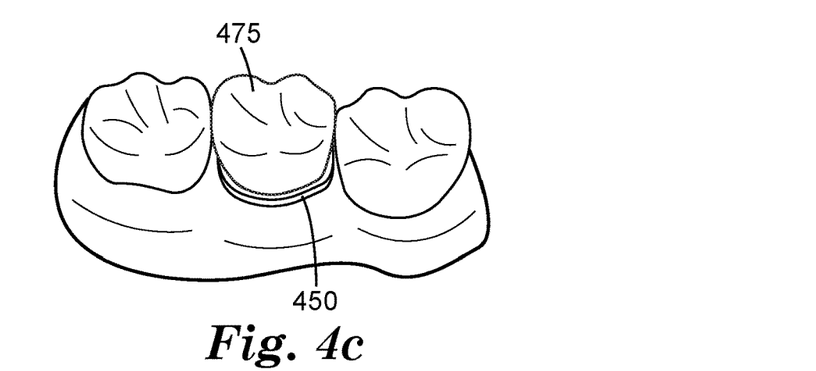
Figure 4D:
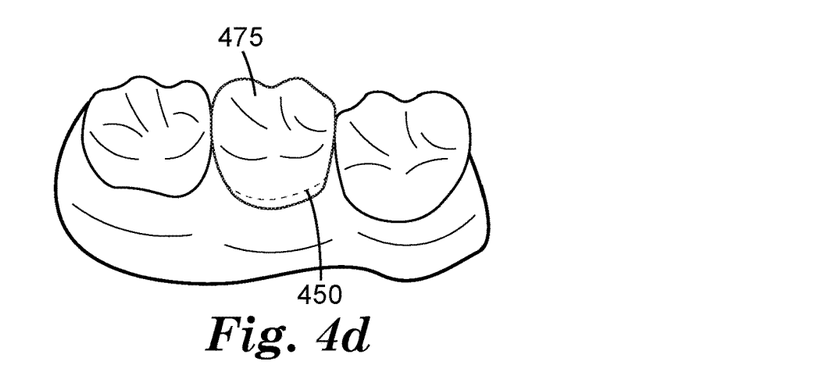
Figure 5A:
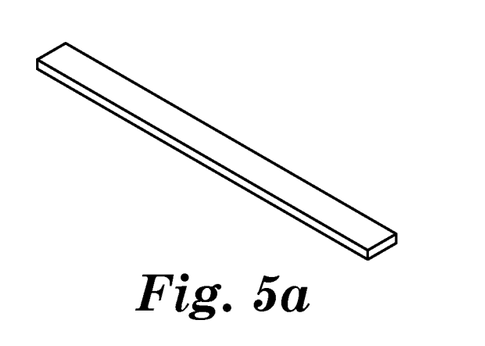
FIGS. 5a-5b and 6a-6b are some embodied dental articles suitable for improving margins.
Figure 5B:
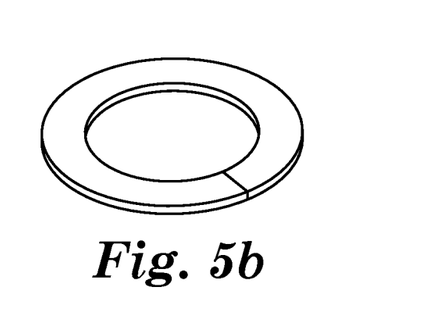
Figure 6A:
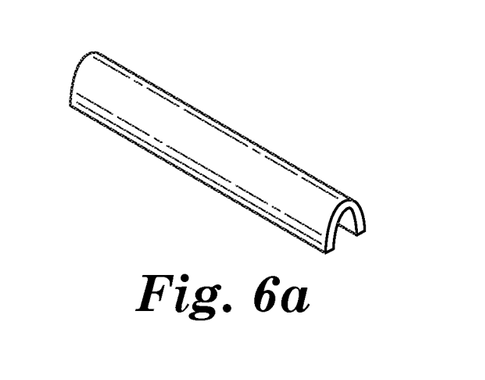
Figure 6B:
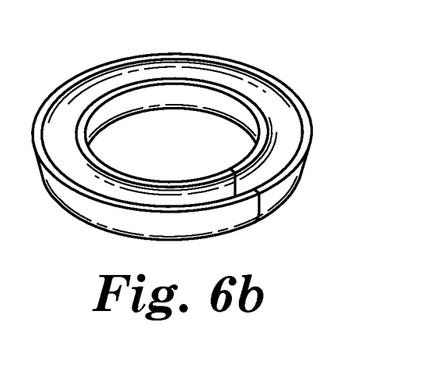

In another embodiment, the uncured dental article can be used during the (e.g. initial) placement of a preformed dental article, most commonly a crown. For example, FIGS. 4a-4d depict a method of placing a preformed dental article. The method generally comprises providing a preformed dental article 475, such as by selecting an appropriate shape and size of a preformed crown, and providing an uncured self-supporting dental article 450 having a first shape. The depicted uncured dental (e.g. margin) article 150 has a (first) ribbon shape wherein the ribbon is formed into a ring by contacting the ends of the ribbon with each other. The method further comprises placing the preformed dental article onto a tooth structure such that the uncured dental article is provided at an interface between the preformed dental article and tooth structure. With reference to FIG. 4b, the uncured dental (e.g. margin) article 450 (or 6b) may be first placed such that it surrounds the base of the tooth structure 201. The preformed dental (e.g. crown) article 450 is then placed over the tooth structure. In the case of the dental (e.g. margin) article of 6b, the base edges of the crown may be seated within the U-shaped channel. The dental (e.g. margin) article 450 is disposed between the tooth structure 201 and preformed dental (e.g. crown) article 450. The method further comprises forming the uncured dental article into a second shape thereby improving the continuity of the interface. The second shape is typically provided at least in part by applying a downward force to the preformed dental (e.g. crown) article 450. The dental (e.g. margin) article 450 functions as a gasket, filling any voids between the tooth structure 201 and preformed dental (e.g. crown) article 450 Such force in combination with the sufficiently malleability of the dental (e.g. margin) article 450 generally results in the excess dental (e.g. margin) article material being forced to the outer exposed surface. The excess material can then be removed and custom shaped as previously described.

Once the desired custom second shape has been achieved, the dental (e.g. margin) article is hardened (e.g. cured) by exposing it to heat/radiation to cause activation of the initiator system. This can be done either in a single step, or in multiple steps with successive steps of custom shaping being done in-between. One or more of these steps can be carried out in an oxygen-free inert atmosphere or in vacuum. After the final shaping and hardening steps, the hardened article can be further modified in shape by grinding, trimming, etc., if desired. Once the final custom shape of the article has been obtained, it can be polished, painted, or otherwise surface treated, if required for the intended application.

The dental (e.g. margin) article may be shaped and cured in situ or on a tooth structure of a typodont model. The method further comprises bonding the dental (e.g. margin) article to the tooth structure. This can occur prior to or after forming the uncured dental (e.g. margin) article into a second (e.g. custom) shape. Various dental adhesives and more commonly a dental cements can be used for in site bonding of the dental (e.g. margin) article to the tooth structure. Suitable dental cements and adhesives are available 3M Oral Care under the trade designations SCOTCHBOND Universal Adhesive, ADPER Single Bond Plus, ADPER PROMPT L-POP Self Etch Adhesive, ADPER SCOTCHBOND Multi-Purpose Adhesive, RELYX Luting Plus Cement, RELYX Unicem 2 Self-Adhesive Resin Cement, and RELYX Ultimate Adhesive Resin Cement.

Various preformed dental article can be utilized in combination with the uncured dental (e.g. margin) article include, but are not limited to crowns, bridges, inlays, onlays, veneers, dental implant articles.

The preformed dental articles (e.g. preformed crowns) can be formed from a variety of materials including, but not limited to, metal, porcelain, ceramic, glass, glass-ceramic, glass-infiltrated ceramic, plastic (filled or unfilled), resin (filled or unfilled, cured or uncured), and combinations thereof. Metal-based preformed dental articles can be formed from stainless steel (of various types), nickel alloys, nickel-titanium alloys, and the like. In the case of stainless steel preformed dental articles, iron can be alloyed with one or more of chromium, nickel, manganese, vanadium, carbon, titanium, aluminum, silicon, tantalum, molybdenum. Metal-based preformed dental articles can be formed from noble metals (e.g., gold, platinum, palladium, silver) and alloys thereof. Metal-based (or other) preformed dental articles may include facings or coatings aimed to provide a more aesthetically pleasing article in comparison to unfaced (e.g., bare) metal. For example, a stainless steel crown may include a tooth-colored polymeric coating such as that described in U.S. Pat. Pub. No. 2013/0130203 (Velamakanni et al.), U.S. Pat. Publ. No. 2013/0137064 (Velamakanni et al.), U.S. Pat. No. 9,370,404 (Velamakanni et al.), or U.S. Pat. No. 9,044,292 (Velamakanni et al.). Metal-based preformed dental articles may include various metal coatings, such as those described in WO2015/088976 (Velamakanni et al.). Metal-based preformed dental articles may include a porcelain coating (e.g., a porcelain-fused-to-metal, "PFM" crown). Examples of ceramic, glass, and glass ceramic materials include, but are not limited to: alumina, zirconia, leucite reinforced glass ceramic, lithium disilicate, and the like. In the case of zirconia-based preformed dental articles, the zirconia can be stabilized with various stabilizers known in the art including, but not limited to magnesium oxide (MgO), calcium oxide (CaO), yttrium oxide ($Y_2O_3$), cerium oxide ($CeO_2$), aluminum oxide ($Al_2O_3$), scandium oxide ($Sc_2O_3$), ytterbium oxide ($Yb_2O_3$), hafnium oxide ($HfO_2$) and combinations thereof. Examples of stabilized zirconia compositions include those described in U.S. Pat. No. 6,709,694 (Suttor et al.) and U.S. Pat. Pub. No. 2013/0341812 (Schechner et al.). Preformed dental articles may be constructed from various plastic and resin-based materials, either of which may include a filler (e.g. particulate fillers, fibers, etc., such as those described in U.S. Pat. No. 6,899,948 (Zhang et al.), U.S. Pat. No. 6,730,156 (Windisch et al.), U.S. Pat. No. 6,572,693 (Wu et al.)) as a strengthening material. Examples of suitable plastic materials include, but are not limited to, polymers and co-polymers of polyacetal (e.g., polyoxymethylene, "POM"), polyacrylate, polymethylmethacrylate ("PMMA"), polyamide, polycarbonate, polyaryletherketone ("PAEK"), polyetheretherketone ("PEEK"), polyetherketoneketone ("PEKK"), polyetherimide ("PEI"), polyketone, polysulfone, polyethylene (e.g., ultra-high molecular weight polyethylene), polyphenylenesulfide ("PPS") and combinations thereof. Resin based materials include those based on (meth)acrylate and/or epoxide-based systems such as those in the references previously listed, as well as in U.S. Pat. No. 7,255,562 (Rusin et al.) and U.S. Pat. Pub. No. 2014/0162216 (Craig et al.).

In one embodiment, the preformed dental (e.g. crown) article comprises an uncured dental material. In this embodiment, the preformed dental (e.g. crown) article may comprise the same or similar composition as the uncured dental (e.g. margin) article.

In this embodiment, the method may further comprise placing the (e.g. uncured) preformed crown on the tooth structure to determine the extent of trimming and shaping required, optionally making marks on the crown. The preformed crown is removed from the tooth structure and the required shape and size adjustments are made by cutting, trimming, shaping, etc., and then re-seated on the tooth preparation where additional shape adjustments are made to provide optimum custom fit, including gingival, lateral, and occlusal fit. The preformed and reshaped crown can then be hardened, typically by exposing it to a dental curing light for a few seconds, if desired, while in the mouth, and then removing it carefully from the mouth and exposing it for final cure to a curing light in a cure chamber, optionally in combination with heat. Alternatively, the crown can also be completely cured in the mouth by irradiating it with a dental curing light. Final adjustments are made by grinding, trimming, etc., if required, and the finished crown is polished and cleaned. The dental margin article can then be placed between the cured preformed dental (e.g. crown) article and the tooth structure. The dental margin article is then formed into a second shape to fill any gaps and seal the margin; followed by curing. The finished crown and dental margin article can then be cemented as is or lined with a suitable resin material prior to placement in the mouth.

The dental (e.g. margin) article and in some embodiments, also the preformed dental (e.g. crown) article may both comprise a hardenable (uncured) self-supporting materials with sufficient malleability to be shaped such as is described in U.S. Pat. No. 7,674,850 (Karim et al.), U.S. Pat. No. 7,811,486 (Karim et al.), U.S. Pat. Pub. No. 2008/0293018 (Karim et al.), U.S. Pat. No. 8,979,536 (Jones et al.), U.S. Pat. No. 8,906,981 (Yang et al.), and U.S. Pat. No. 8,445,558 (Karim, et al.). Thus, the forthcoming description of the dental (e.g. margin) article is also applicable to this embodiment of the preformed dental (e.g. crown) article.

The uncured self-supporting dental (e.g. margin) article typically has rheological properties similar to waxes below the waxes' melting points in that they can be relatively easily deformed (i.e., they are malleable) and exhibit low elastic recovery. However, the composition of the dental (e.g. margin) articles are not free-flowing fluids (i.e., liquids) above their softening points. That is, the dental (e.g. margin) articles exhibit appreciable mass flow under moderate (e.g., hand) pressure, but not liquid flow above their softening points.

Elastic and viscous dynamic moduli of the uncured self-supporting dental (e.g. margin) article can vary. The elastic dynamic modulus (i.e., elastic modulus) G' is typically at least about 100 kilopascals (kPa), 200 kPa, or 1000 kPa, at a frequency of about 0.005 Hz. The elastic modulus G' is typically no greater than about 50,000 kPa; 10,000 kPa, or 5000 kPa, at a frequency of about 0.005 Hz. In some embodiments, the viscous dynamic modulus (i.e., viscous modulus) G" is at least about 50 kPa, 200 kPa, or 1000 kPa, at a frequency of about 0.005 Hz. The viscous modulus G" is typically no greater than about 50,000 kPa; 10,000 kPa, or 5000 kPa, at a frequency of about 0.005 Hz.

Furthermore, the uncured self-supporting dental (e.g. margin) articles are typically characterized as having little or no tack.

After hardening by curing, the cured dental (e.g. margin) article typically has a flexural strength of at least about 25 megapascals (MPa), 40 MPa, 50 MPa, 60, or 80 MPa. In some embodiments, the cured dental (e.g. margin) article has a flexural strength of no greater than 200 MPa. In other embodiments, the cured dental (e.g. margin) article is an enamel-like solid having a flexural modulus of at least about 1000 MPa and typically no greater than 15,000 MPa. The cured dental (e.g. margin) article may have a compressive strength of at least about 100 MPa.

The uncured dental (e.g. margin) article comprises a (e.g. free-radically) polymerizable resin system. The resin system includes one or more polymerizable organic resins capable of forming a hardened material having sufficient strength and hydrolytic stability to render them suitable for use in the oral environment.

volume shrinkage uncured dental (e.g. margin) articles exhibit a Watts Shrinkage of less than 2.5%. In other embodiments, the Watts Shrinkage is less than 2.0%, or 1.9%, or 1.8%, or 1.7% or 1.6%.

In some embodiments, the multi-(meth)acrylate monomer is derived is a bisphenol A monomer such as 2,2-bis[4-(2-hydroxy-3-methacryloyloxypropoxy)phenyl]propane (Bis-GMA). A representative structure for BisGMA is depicted as follows, having a (i.e. calculated) molecular weight of about 512 g/mole:

Another class of monomers derived from bisphenol A are branched multi(meth)acrylate monomers (e.g. having pendant (meth)acrylate moities) such as described in WO2008/08288; incorporated herein by reference. These branched multi(meth)acrylate monomer may have the general formula As used herein, the polymerizable resin includes one or more monomers, oligomers, and/or polymerizable polymers, including combinations thereof. Although, in this context oligomers and polymers are both used, the terms "polymer" and "polymeric" are used herein to refer to any materials having 2 or more repeat units, thereby encompassing oligomers. Thus, unless otherwise specified, polymers include oligomers. Furthermore, the term polymer is used herein to encompass both homopolymers and copolymers, and the term copolymer is used herein to encompass materials with two or more different repeat units (e.g., copolymers, terpolymers, tetrapolymers).

In typical embodiments, at least some of the polymerizable resin components include ethylenic unsaturation and are capable of undergoing (free-radical) addition polymerization. A suitable resin includes at least one ethylenically unsaturated monomer (i.e., includes at least one carbon-carbon double bond).

The polymerizable resin typically comprises at least one multi-(meth)acrylate aromatic monomer. The selection of components of the polymerizable resin and the concentration of such are generally chosen to minimize polymerization shrinkage. The uncured dental (e.g. margin) article described herein typically comprises at least one di-(meth)acrylate aromatic monomer The polymerization shrinkage can be determined via various methods such as Watts Shrinkage that measure the volumetric change after curing. In some embodiments, low wherein each X independently represents an oxygen atom (O) or a nitrogen atom (N); Y and A each independently represent an organic group, and $R^1$ represents —C(O)C(CH$_3$)=CH$_2$, and/or (ii) q=0 and $R^2$ represents —C(O)C(CH$_3$)=CH$_2$; m=1 to 5; n=0 to 5; p and q are independently 0 or 1; and $R^1$ and $R^2$ each independently represent H, —C(O)CH=CH$_2$, or —C(O)C(CH$_3$)=CH$_2$. In some embodiments, such as described in WO2008/08288, Y does not represent —NHCH$_2$CH$_2$— if (i) p=0.

Branched multi-(meth)acrylate monomers (e.g. having pendant (meth)acrylate moieties) having urethane linkages are described in EP2008636. In favored embodiments, at least one $R^1$ or $R^2$ is —C(O)CH=CH$_2$, or —C(O)C(CH$_3$)=CH$_2$.

When the uncured dental (e.g. margin) article or composition thereof comprises a low shrinkage multi-(meth)acrylate monomer derived from bisphenol A, the composition may be free of other multi-(meth)acrylate aromatic monomer such as biphenyl di(meth)acrylate monomers In other embodiments, the polymerizable resin may be free monomer(s) derived from bisphenol A. For example, the low volume shrinkage monomer may be a di- or tri-(meth)acrylate isocyanurate monomer, such as described in U.S. Provisional Application Ser. No. 61/319,534, filed Mar. 31, 2010; incorporated herein by reference.

The polymerizable resin system optionally may comprise other polymerizable components. Examples of suitable polymerizable resin components include: mono-, di-, or poly-(meth)acrylates (including acrylates and methacrylates) such as methyl acrylate, methyl methacrylate, ethyl acrylate, isopropyl methacrylate, n-hexyl acrylate, stearyl acrylate, allyl acrylate, glycerol mono- and diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexaacrylate, bis(1-(2-acryloxy))-p-ethoxyphenyldimethylmethane, bis(1-(3-acryloxy-2-hydroxy))-p-propoxyphenyldimethylmethane, tris(hydroxyethylisocyanurate) trimethacrylate, 2-hydroxyethyl methacrylate, 2-hydroxypropyl methacrylate, tetrahydrofurfuryl methacrylate, ethylene glycol dimethacrylate, triethylene glycol dimethacrylate, ethoxylated bisphenolA diacrylate, ethoxylated bisphenolA dimethacrylate (e.g. Bis-EMA6), polyethylene glycol dimethacrylate, the bis-acrylates and bis-methacrylates of polyethylene glycols of molecular weight 200-500, copolymerizable mixtures of acrylated monomers such as those of U.S. Pat. No. 4,652,274 (Boettcher et al.), and acrylated oligomers such as those of U.S. Pat. No. 4,642,126 (Zador et al.); unsaturated amides such as (meth)acrylamides (i.e., acrylamides and methacrylamides), methylene bis-acrylamide, methylene bis-methacrylamide, 1,6-hexamethylene bis-acrylamide, diethylene triamine tris-acrylamide, and beta-methacrylamidoethyl methacrylate, diacetone acrylamide, and diacetone methacrylamide; urethane (meth)acrylates; and vinyl compounds such as styrene, diallyl phthalate, divinyl succinate, divinyl adipate, and divinylphthalate. Mixtures of two or more such materials can be used if desired in the resin system.

In some embodiments, the uncured dental (e.g. margin) article or composition thereof comprises a low shrinkage aromatic di(meth)acrylate monomer such as BisGMA in combination with one or more other free-radically polymerizable (e.g. methacrylate) monomers. In certain embodiments, the other hardenable components can include diurethane dimethacrylate (UDMA), triethyleneglycol dimethacrylate (TEGDMA), and ethoxylated bisphenol A dimethacrylate as described in U.S. Pat. No. 6,030,606 (Holmes), also referred to herein as "Bis-EMA6"; and 2,2-bis[4-(2-hydroxy-3-methacryloyloxypropoxy)phenyl] propane (Procrylate). In some embodiments, the uncured dental (e.g. margin) article comprises BisGMA in combination with ethoxylated bisphenol A dimethacrylate and diurethane dimethacrylate.

The concentration of the other monomers (including the semi-crystalline resin as will subsequently be described) is generally no greater than 20 wt-% or 15 wt-% based on the total weight of the uncured dental (e.g. margin) article or composition thereof. In some embodiments, the concentration is less than 15 wt-%, or 14 wt-% or 13 wt-%. In some embodiments, the concentration is typically less than 12 wt-%, or 11 wt-%, or 10 wt-%. In other embodiments, the concentration is typically less than 9 wt-%, or 8 wt-%, or 7 wt-%, or 6 wt-%, or 5 wt-%. The inclusion of 1 wt-% or 2 wt-%, or 3 wt-% of other monomers that are lower in molecular weight than BisGMA may increase the rate of polymerization of the uncured dental (e.g. margin) article during curing.

The (organic) polymerizable resin system is typically at least about 10 wt-%, 12 wt-%, or 14 wt-%, based on the total weight of the uncured dental (e.g. margin) article or composition thereof. The (organic) polymerizable resin system is typically no greater than about 30 wt-% or 25 wt-% of the uncured dental (e.g. margin) article. In some embodiments, the (organic) polymerizable resin system is less than 25 wt-%, or 24 wt-%, or 23 wt-%, or 22 wt-%, or 21 wt-%, or 20 wt-% of the uncured dental (e.g. margin) article.

The above-listed components are typically noncrystalline (i.e., amorphous). The polymerizable resin system also includes a crystalline component to impart the noncovalent three-dimensional structure for maintaining the initial preformed shape. This crystalline component may or may not have a reactive group capable of polymerizing (also including crosslinking). In typical embodiments, the crystalline component is polymerizable. Further, the crystalline component is typically polymeric (including oligomeric). In some embodiments, the crystalline component is a polymerizable polymeric material.

By "crystalline" it is meant that the material displays a crystalline melting point at 20° C. or above when measured in the composition by differential scanning calorimetry (DSC). The peak temperature of the observed endotherm is taken as the crystalline melting point. The crystalline phase includes multiple lattices in which the material assumes a conformation in which there is a highly ordered registry in adjacent chemical moieties of which the material is constructed. The packing arrangement (short order orientation) within the lattice is highly regular in both its chemical and geometric aspects.

The polymerizable resin system preferably comprises a semi-crystalline component. A semi-crystalline component typically comprises long segments of polymer chains that appear in both amorphous and crystalline states or phases at 20° C. or above. The amorphous phase is considered to be a randomly tangled mass of polymer chains. The X-ray diffraction pattern of an amorphous polymer is a diffuse halo indicative of no ordering of the polymer structure. Amorphous polymers show softening behavior at the glass transition temperature, but no true melt or first order transition. A material in a semicrystalline state shows characteristic melting points, above which the crystalline lattices become disordered and rapidly lose their identity. The X-ray diffraction pattern of such "semicrystalline" materials generally is distinguished by either concentric rings or a symmetrical array of spots, which are indicative of the nature of the crystalline order.

The number average molecular weight of the semi-crystalline component may vary over a broad range. The molecular weight is typically less than 10,000 grams per mole (g/mol), and more typically no greater than about 5000 g/mol. The molecular weight is at least about 150 g/mol, and more preferably at least about 400 g/mol.

Examples of suitable semi-crystalline resins having crystallizable main chain or backbone segments include, but are not limited to, polyesters (including polycaprolactones), polyethers, polythioethers, polyarylalkylenes, polysilanes, polyamides, polyolefins (preferably, formed from lower, e.g., $C_2$-$C_3$, olefins), and polyurethanes.

The semi-crystalline resin can comprise polycaprolactone repeat units. Polycaprolactone (PCL) homopolymer is a biodegradable polyester with a low melting point of about 60° C. and a glass transition temperature of about −60° C. PCL can be prepared by ring opening polymerization of ε-caprolactone using a catalyst such as stannous octanoate, forming repeat units of polycaprolactone having the general structure:

PolyCaprolactone

The polycaprolactone polymers utilized herein are typically derived from linear polyester diols derived from caprolactone. One suitable linear polyester diols derived from caprolactone is Capa™ 2125, reported to have a hydroxyl values of 90 mg KOH/g.

In a favored embodiment, the free-radically polymerizable semi-crystalline resin utilized herein is derived from a polycarpolactone diol having a melt point of 35° C. to 45° C.

In some embodiments, the semi-crystalline resin is a reaction product of a polycarprolactone diol and a hydroxyl reactive (meth)acrylate such as an isocyanatoalkyl (meth) acrylate (e.g. 2-isocyanatoethyl methacrylate), methacryloyl chloride, or methacrylic anhydride to convert the hydroxyl group(s) to free-radically polymerizable (e.g. (meth)acrylate) groups.

In some embodiments, the free-radically polymerizable semi-crystalline component (e.g. the reaction product of polycaprolactone diol and isocyanatoalkyl (meth)acrylate) has a number average molecular weight (as measured according to the test method described in the examples) of no greater than 3,000 g/mole. In some embodiments, the number average molecular weight of the free-radically polymerizable semi-crystalline component is no greater than 2700 g/mole or 2600 g/mole or 2500 g/mole. The molecular weight is typically at least about 400 g/mol or 500 g/mol. In some favored embodiments, the semi-crystalline component has a number average molecular weight of at least 1000 g/mole.

The concentration of the semi-crystalline component(s) (e.g. polycaprolactone (meth)acrylate resin) is at least about 0.5 wt-% or 1.0 wt-%, based on the total weight of the uncured dental (e.g. margin) article or composition thereof. In some embodiments, the total amount of semi-crystalline component is no greater than about 15 wt-%. In some embodiments, the total amount of semi-crystalline components is no greater than 10 wt-% or 8 wt-%. In some embodiments, the concentration of semi-crystalline component ranges from about 0.8 wt-% to about 2.5 wt-%. In other embodiments, the concentration of semi-crystalline component is at least 3.0 or 3.5 wt-% and typically no greater than 6.0 wt-%, or 5.5 wt-%, or 5.0 wt-%.

In some embodiments, the semi-crystalline component is the sole crystalline component of the uncured dental (e.g. margin) article or composition thereof. In this embodiment, the uncured dental (e.g. margin) article or composition thereof is free of crystalline components that are not semi-crystalline. In other embodiments, the semi-crystalline component may be employed in combination with other crystalline components. In this later embodiment, the semi-crystalline component is the major crystalline component, i.e. at least 50%, 60%, 70%, 80%, 90% or greater of the total concentration of crystalline components. When a crystalline component is employed in combination with a semi-crystalline component, the crystalline component may also have a number average molecular weight of no greater than 2,000 g/mol. Alternatively, the crystalline component may also have a greater number average molecular weight, ranging up to than 5,000 g/mol or 10,000 g/mole. The total amount of crystalline and semi-crystalline component is typically within the range previously described with respect to the concentration of semi-crystalline component(s) in the uncured dental (e.g. margin) article or composition thereof.

The crystalline monomers suitable for use in the resin system include monomers containing urethane, ether, ester, amide, imide groups, or combinations thereof. Preferred crystalline monomers contain reactive groups capable of polymerizing and/or crosslinking. Especially preferred are monomers with a reactive functionality greater than one.

The crystalline polymers (including oligomers) suitable for use in the resin system can have crystalline main chain (i.e., linear) or pendant (i.e., side chain) segments. Preferred materials also contain reactive groups capable of polymerizing and/or crosslinking. Especially preferred are crystalline oligomers or prepolymers with a reactive functionality of at least two.

Examples of suitable crystalline materials having crystallizable main chain or backbone segments include, but are not limited to, polyesters (including polycaprolactones), polyethers, polythioethers, polyarylalkylenes, polysilanes, polyamides, polyolefins (e.g., formed from lower, e.g., $C_2$-$C_3$, olefins), and polyurethanes. Various crystalline material are described in U.S. Pat. Nos. 7,674,850 and 7,816,423; incorporation herein by reference.

The crystalline components, including the semi-crystalline component crystallizes at least in part above room temperature (i.e., 20° C. to 25° C.). Such crystallinity, that may be provided by the aggregation of crystallizable moieties present in the component (e.g., when the component is a polymer, in the backbone (i.e., main chain) or pendant substituents (i.e., side chains) of the component), can be determined by well known crystallographic, calorimetric, or dynamic/mechanical methods. For the purposes of the present invention, this component imparts to the resin system at least one melting temperature (Tm) as measured experimentally (for example by DSC) of greater than about 20° C. This component typically imparts a Tm to the resin system of about 30° C.-100° C. If more than one crystalline material is used in the crystalline component, more than one distinct melting point may be seen.

The polymerizable resin may optionally comprise an organogelator as described in US2009/0305196. However, the desired properties can be achieved when the uncured dental (e.g. margin) article is free of organogelator.

The uncured dental (e.g. margin) article or composition thereof comprises a major amount of filler. The filler is generally (non-toxic) suitable for use in the mouth. The filler can be radiopaque, radiolucent, or nonradiopaque.

Inorganic fillers, as used in dental applications, are typically ceramic in nature.

Examples of suitable inorganic fillers are naturally occurring or synthetic materials such as quartz, nitrides (e.g., silicon nitride), glasses derived from, for example Ce, Sb, Sn, Zr, Sr, Ba, or Al, colloidal silica, feldspar, borosilicate glass, kaolin, talc, titania, and zinc glass, zirconia-silica fillers; and low Mohs hardness fillers such as those described in U.S. Pat. No. 4,695,251 (Randklev). The nanoscopic filler particles are typically composed of silica, alumina, zirconia, titania, or mixtures of these materials with each other.

The filler comprises nanoscopic fillers. Due to their small size, high surface area, and associated hydrogen bonding, these materials are known to assemble into aggregated networks. Materials of this type ("nanoscopic" materials) have average primary particle sizes (i.e., the largest dimension, e.g., diameter, of unaggregated material) of less than 200 nanometers (nm). In some embodiments, the nanoscopic particulate material has an average primary particle size of at least about 2 nanometers (nm), 3 nm, 4 nm, 5 nm, 6 nm, or 7 nm. In some embodiments, the nanoscopic particulate material has an average primary particle size of no greater than about 50 nm, 40 nm, 30 nm, or 20 nm in size. The average surface area of such a filler is typically at least about 20 square meters per gram (m²/g), 50 m²/g, or 100 m²/g.

The filler may comprise nanoparticles in the form of nanoclusters, i.e. a group of two or more particles associated by relatively weak intermolecular forces that cause the particles to clump together, even when dispersed in a hardenable resin. Preferred nanoclusters can comprise a substantially amorphous cluster of non-heavy (e.g. silica) particles, and an amorphous heavy metal oxide (i.e. having an atomic number greater than 28) such as zirconia. The particles of the nanocluster typically have an average diameter of less than about 100 nm. Suitable nanocluster fillers are described in U.S. Pat. No. 6,730,156 (Windisch et al.); incorporated herein by reference In some embodiments, the uncured dental (e.g. margin) article described herein comprises at least 40 wt-%, or 45 wt-% or 50 wt-% of (e.g. silica/zirconia) nanoclusters. The concentration of (e.g. silica/zirconia) nanoclusters is typically no greater than about 65 wt-%.

In favored embodiments, the uncured dental (e.g. margin) article comprises a (i.e. non-associated) nanoscopic inorganic filler in combination with the (e.g. silica/zirconia) nanoclusters. Such nanoscopic inorganic filler typically comprises silica nanoparticles.

The uncured dental (e.g. margin) article described herein generally comprise at least 10 wt-% or 15 wt-% of (e.g. silica) nanoscopic filler(s). The concentration of (e.g. silica) nanoscopic filler is typically no greater than about 30 wt-% or 40 wt-%.

Suitable nano-sized silicas are commercially available from Nalco Chemical Co. (Naperville, Ill.) under the product designation NALCO COLLOIDAL SILICAS. For example, preferred silica particles can be obtained from using NALCO products 1040, 1034A, 1060, 2327 and 2329.

Silica particles are typically made from an aqueous colloidal dispersion of silica (i.e., a sol or aquasol). The colloidal silica is typically in the concentration of about 1 to 50 weight percent in the silica sol. Colloidal silica sols which can be used in preparing the fillers of the invention are available commercially having different colloid sizes, see Surface & Colloid Science, Vol. 6, ed. Matijevic, E., Wiley Interscience, 1973. Preferred silica sols for use making the fillers of the invention are those which are supplied as a dispersion of amorphous silica in an aqueous medium (such as the Nalco colloidal silicas made by Nalco Chemical Company) and those which are low in sodium concentration and can be acidified by admixture with a suitable acid (e.g. Ludox colloidal silica made by E. I. Dupont de Nemours & Co. or Nalco 2326 from Nalco Chemical Co.).

In some embodiments, the silica particles in the sol have an average particle diameter of about 5-100 nm, 10-50 nm, or 12-40 nm. One illustrative silica sol is NALCO 2327.

The nano-sized filler may also include fumed silica. In some embodiments, the fumed silica is present in an amount ranging from 1 wt-% or 2 wt-% up to 5 wt-%.

In some embodiments, the total amount of nanoscopic filler (including the nanocluster) is greater than 50 wt-%, 60 wt-%, or 70 wt-%, based on the total weight of the uncured dental (e.g. margin) article or composition thereof. Preferably, the total amount of filler is no more than about 95 wt-% or 80 wt-% of the uncured dental (e.g. margin) article or composition thereof.

The filler can optionally include other fillers. Such optional other fillers may be either particulate or fibrous in nature. Particulate fillers may generally be defined as having a length to width ratio, or aspect ratio, of 20:1 or less, and more commonly 10:1 or less. Fibers can be defined as having aspect ratios greater than 20:1, or more commonly greater than 100:1. The shape of the particles can vary, ranging from spherical to ellipsoidal, or more planar such as flakes or discs. The macroscopic properties can be highly dependent on the shape of the filler particles, in particular the uniformity of the shape.

Particulate filler is finely divided and typically has an average particle size of less than about 10 micrometers (i.e., microns). The filler can have a unimodal or polymodal (e.g., bimodal) particle size distribution.

The optional filler can be an inorganic material, as previously described. It can also be a crosslinked organic material that is insoluble in the polymerizable resin, and is optionally filled with inorganic filler. Examples of suitable organic filler particles include filled or unfilled pulverized polycarbonates, polyepoxides, and the like. Preferred filler particles are quartz, submicron silica, and non-vitreous microparticles of the type described in U.S. Pat. No. 4,503,169 (Randklev). Mixtures of these fillers can also be used, as well as combination fillers made from organic and inorganic materials.

The surfaces of the inorganic filler particles are typically treated with a surface treatment, such as a silane-coupling agent, in order to enhance the bond between the filler and the resin system. The coupling agent may be functionalized with reactive curing groups, such as acrylates, methacrylates, and the like.

Filler particles composed of silica, alumina, zirconia, titania, or mixtures of these materials are commonly hydrophilic, due to the presence of surface hydroxyl groups. However, the filler materials are typically modified by treatment with appropriate agents, to render the surface increasingly hydrophobic.

The nanoscopic filler (including the nanoclusters) are typically surface treated with an organometallic coupling agent to enhance the bond between the filler and the resin. The organometallic coupling agent may be functionalized with reactive curing groups, such as acrylates, methacrylates, vinyl groups and the like.

Suitable copolymerizable organometallic compounds may have the general formula:

$CH_2=C(CH_3)_m Si(OR)_n$ or $CH_2=C(CH_3)_m C=OOASi(OR)_n$ wherein m is 0 or 1,
R is an alkyl group having 1 to 4 carbon atoms,
A is a divalent organic linking group, and
n is from 1 to 3.

Preferred coupling agents include gamma-methacryloxypropyltrimethoxysilane, gamma-mercaptopropyltriethoxysilane, gamma-aminopropyltrimethoxysilane, and the like.

The surface modification can be done either subsequent to mixing with the monomers or after mixing. It is typically preferred to combine the organosilane surface treatment compounds with nanoparticles before incorporation into the resin. The required amount of surface modifier is dependent upon several factors such particle size, particle type, modifier molecular wt, and modifier type. In general it is preferred that approximately a monolayer of modifier is attached to the surface of the particle.

In some embodiments, the fumed silica does not comprise surface modification.

The polymerizable resin system contains an initiator system, i.e., one initiator or a mixture of two or more initiators, which are suitable for hardening (e.g., polymerizing and/or crosslinking) of the resin system, as described in U.S. Pat. Nos. 7,674,850 and 7,816,423. The initiators are preferably free radical initiators, which may be activated in a variety of ways, e.g., heat and/or radiation. Thus, for example, the initiator system can be a thermal initiator system (e.g., azo compounds and peroxides), or a photoinitiator system. The initiator system includes one or more photoinitiators. The initiator system may include at least one photoinitiator active in the spectral region of about 300 nanometers (nm) to about 1200 nm and capable of promoting free radical polymerization and/or crosslinking of ethylenically unsaturated moieties upon exposure to light of suitable wavelength and intensity. A wide variety of such photoinitiators can be used. The photoinitiator is typically soluble in the resin system. Photoinitiators are generally sufficiently shelf stable and free of undesirable coloration to permit storage and use under typical dental operatory and laboratory conditions. Visible light photoinitiators are preferred.

One type of suitable initiator (i.e., initiator system) is described in U.S. Pat. No. 5,545,676 (Palazzotto et al.), which includes a three component or ternary photoinitiator system. This system includes an iodonium salt, e.g., a diaryliodonium salt, which can be a simple salt (e.g., containing an anion such as $Cl^-$, $Br^-$, $I^-$, or $C_2H_5SO_3^-$) or a metal complex salt (e.g., containing $SbF_5OH^-$ or $AsF_6^-$). Mixtures of iodonium salts can be used if desired. The second component in this ternary photoinitiator system is a sensitizer, which is capable of light absorption within the range of wavelengths of about 400 nm to about 1200 nm. The third component in this ternary photoinitiator system is an electron donor and includes amines (including aminoaldehydes and aminosilanes or other amines as described for the first initiator system), amides (including phosphoramides), ethers (including thioethers), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid and salts of tetraphenylboronic acid.

Examples of sensitizers suitable for use in a ternary photoinitiator system include ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes, and pyridinium dyes. Ketones (e.g., monoketones or alpha-diketones), ketocoumarins, aminoarylketones, and p-substituted aminostyryl ketone compounds are preferred sensitizers. Examples of particularly preferred visible light sensitizers include camphorquinone, glyoxal, biacetyl, 3,3,6,6-tetramethylcyclohexanedione, 3,3,7,7-tetramethyl-1.2-cycloheptanedione, 3,3,8,8-tetramethyl-1,2-cyclooctanedione, 3,3,18,18-tetramethyl-1,2-cyclooctadecanedione, dipivaloyl, benzil, furil, hydroxybenzil, 2,3-butanedione, 2,3-pentanedione, 2,3-hexanedione, 3,4-hexanedione, 2,3-heptanedione, 3,4-heptanedione, 2,3-octanedione, 4,5-octanedione, and 1,2-cyclohexanedione. Of these, camphorquinone is the most preferred sensitizer.

Preferred visible light-induced initiators include camphorquinone combined with a suitable hydrogen donor (e.g., an amine such as those described above for the first initiator system), and optionally a diaryliodonium simple or metal complex salt, chromophore-substituted halomethyl-s-triazine, or halomethyl oxadiazole. Particularly preferred visible light-induced photoinitiators include combinations of an alpha-diketone, e.g., camphorquinone with additional hydrogen donors, and optionally a diaryliodonium salt, e.g., diphenyliodonium chloride, bromide, iodide or hexafluorophosphate.

Preferred ultraviolet light-induced polymerization initiators include ketones, such as benzyl and benzoin, acyloins, and acyloin ethers. Preferred ultraviolet light-induced polymerization initiators include 2,2-dimethoxy-2-phenylacetophenone available under the trade designation IRGACURE 651 and benzoin methyl ether (2-methoxy-2-phenylacetophenone), both from Ciba Specialty Chemicals Corp., Tarrytown, N.Y.

Various other initiators are known in the art, such as described in U.S. Pat. Nos. 7,674,850 and 7,816,423.

The initiator system is present in an amount sufficient to provide the desired rate of hardening (e.g., polymerizing and/or crosslinking). For a photoinitiator, this amount will be dependent in part on the light source, the thickness of the layer to be exposed to radiant energy, and the extinction coefficient of the photoinitiator. The initiator system is typically present in a total amount of at least about 0.01 wt-%, 0.03 wt-%, or 0.05 wt-%, based on the weight of the uncured dental (e.g. margin) article or composition thereof. The initiator system is typically present in a total amount of no more than about 10 wt-%, 5 wt-%, or 2.5 wt-%.

The uncured dental (e.g. margin) article or composition thereof may optionally contain a surfactant system, i.e., one surfactant or a mixture of two or more surfactants. These surfactants, when used in small amounts may interact with other components, such as an inorganic filler material, to enhance the formation of a noncovalent three-dimensional structure. Such surfactants can be nonionic, anionic, or cationic. The surfactant(s) can be copolymerizable with the resin system or non-copolymerizable. A consideration in the choice of a surfactant that can be used is the degree to which the ingredients of the system are able to participate in hydrogen bonding. The desired properties can be achieved when the uncured dental (e.g. margin) article is free of surfactant.

The uncured (e.g. dental) margin article may additionally include optional agents such as colorants (e.g., pigments conventionally used for shade adjustment), flavorants, medicaments, stabilizers (such as BHT), viscosity modifiers, and the like. Such agents may optionally include reactive functionality so that they will be copolymerized with the resin.

In some embodiments, the cured compositions and cured (e.g. crown) articles exhibited improved staining resistance. In some embodiments, the change in color (i.e. Delta E*) may be 1 or 2 units lower relative to a control (e.g. CE-1) when tested in a 15% coffee solution at 37° C. for 3 days. In other embodiments, the change in color may be 3, 4, 5, 6, or 7 units lower relation to a control (e.g. CE-2). Dental (e.g. margin) articles prepared from such compositions also exhibit improved staining resistance.

In some embodiments, the uncured preformed (e.g. crown) articles exhibited improved handling, i.e. "good handling" as determined by the test method described in the forthcoming examples. Dental (e.g. margin) articles prepared from such compositions also exhibit good handling.

In some embodiments, the cured compositions and cured (e.g. crown) articles exhibited improved 3-body wear as determined by the test method described in the forthcoming examples. In favored embodiments, the wear ratio was 0.5 or less. The wear ratio is typically at least 0.1 or 0.2. Dental (e.g. margin) articles prepared from such compositions also exhibit improved 3-body wear.

EXAMPLES

The following examples are given to illustrate, but not limit, the scope of this invention. As used herein, all parts and percentages are by weight unless otherwise specified. All commercial materials were used as obtained from the vendor.

| Component Utilized in the Preparation of the Hardenable Dental Composition | | |
|---|---|---|
| Generic Chemical Description | Cass Number | Supplier |
| IEM (2-isocyanatoethyl methacrylate) | 30674-80-7 | Showa Denko, Japan |
| BisGMA (Bisphenol A diglycidyl ether methacrylate) | 1565-94-2 | Sigma-Aldrich, St. Louis, MO |
| BisEMA-6 (six-mole ethoxylated bisphenol A dimethacrylate, Sartomer CD-541) | | Sartomer Co., Inc., Exton, PA |
| TEGDMA (triethyleneglycol dimethacrylate) | | Sartomer |
| TPEG 990 (polymer of ethylene oxide) | | Dow Chemical Co. |
| Procrylate (2,2-bis-4-(3-hydroxy-propoxy-phenyl)propane dimethacrylate) | 27689-12-9 | Prepared as described in WO 2006/020760 |
| UDMA (diurethane dimethacrylate) | 72869-86-4 | Dajac Laboratories, Trevose, PA |
| CAPA2125 | 36890-68-3 | Solvay Chemical Co., Warrington, UK |
| CAPA2205 | 36890-68-3 | Solvay Chemical Co., Warrington, UK |
| CAPA2200A | | Solvay Chemical Co., Warrington, UK |
| Tone0230 | 36890-68-3 | Dow Chemical Company, Midland, Michigan |
| BHT (2,6-di-tert-butyl-4-methylphenol) | 128-37-0 | Sigma-Aldrich |
| Tinuvin R 796 (benzotriazole polymerizable UV stabilizer) | | Ciba Specialty Chemicals, Tarrytown, NY |
| Dibutyltin Dilaurate | | Sigma-Aldrich |
| Components of Photoinitator Package | | |
| CPQ (camphorquinone) | | Sigma-Aldrich |
| EDMAB (ethyl 4-(N,N-dimethylamino) benzoate) | | Sigma-Aldrich |
| DPIHFP (diphenyl iodonium hexafluorophosphate) | | Alpha Aesar, Ward Hill, MA |
| Pigments | | |
| Red pigment dispersion (viscous dispersion containing red iron III oxide pigment) | | |
| White pigment dispersion (viscous dispersion containing rutile titanium dioxide pigment) | | |
| Black pigment dispersion (viscous dispersion containing a black iron oxide(Fe3O4) pigment) | | |
| Yellow pigment dispersion (viscous dispersion containing a yellow iron III oxide pigment) | | |
| Inorganic Fillers | | |

Zr/Si nanocluster - Refers to silane-treated zirconia/silica nanocluster filler prepared essentially as described in U.S. Pat. No. 6,730,156 (Preparatory Example A (line 51-64) and Example B (column 25 line 65 through column 26 line 40)
20 nm Silica Nanomer - Refers to silane-treated nano-sized silica having a nominal particle size of approximately 20 nanometers, prepared essentially as described in U.S. Pat. No. 6,572,693 B1, (column 21, lines 63-67 for Nanosized particle filler, Type #2)
Cabosil M5 - Refers to a fumed silica available under the trade designation CAB-O-SIL M-5 from Cabot Corp., Boston, MA
S/T Filler - Refers to silane treated zirconia silica filler, prepared as described in Columns 15 and 16 of U.S. Pat. No. 6,624,211

Preparation of Polycaprolactone Di(meth)acrylates

To a 32 oz. glass jar was added about 50 grams of polycaprolactone diol and about 0.04 g BHT, and this was heated in an oil bath to 60° C. After melting of all the solid polycaprolactone and under magnetic stirring, 2 molar equivalent of IEM (about 7.8 g) was added over 15 minutes. A drop (~0.02 g) of dibutyltin dilaurate (Aldrich) was added to the mixture. This reaction was continued at 60° C. for 12 hours. The resulting white solids were characterized with IR and NMR and confirmed to be the respective polycaprolactone IEMs.

Gel Permeation Chromatography (GPC) Test

Approximately 25.0 mgs of each sample was added to 10.0 ml of tetrahydrofuran. The sample solutions were shaken overnight and were filtered with a 0.25 micron Teflon syringe filter The GPC analysis was as follows—

| Instrument | Waters Inc. 2695 Separations Module |
| --- | --- |
| Column set | Jordi Associates 500A (50 cm) |
| Eluent | THF |
| Injection | 100 µL |
| Detector | Shimadzu RID-10A Refractive Index Detector |
| Temperature | 35° C. |

The molecular weight calculations were based upon a calibration made of narrow dispersity polystyrenes ranging in molecular weight from 5.95E+04 down to 266. The actual calculations were completed with Cirrus GPC software from Polymer Labs.

The number average molecular weight (Mn) of the polycaprolactone di(meth)acrylate prepared from the polycaprolactone diol "CAPA 2125" was determined to be 2270 g/mole according to the test method just described.

The number average molecular weight (Mn) of the polycaprolactone di(meth)acrylates of the comparative examples was also determined according to the same test method. The number average molecular weight (Mn) of the polycaprolactone di(meth)acrylate prepared from the polycaprolactone diol "CAPA 2205" was determined to be 3590 g/mole. The number average molecular weight (Mn) of the polycaprolactone di(meth)acrylate prepared from the polycaprolactone diol "Tone 230" was determined to be 2200 g/mole. The number average molecular weight (Mn) of the polycaprolactone di(meth)acrylate prepared from the polycaprolactone diol "CAPA 2200A" was determined to be 2790 g/mole.

Preparation of Curable Dental Restoration Compositions

The components listed in Table 1 were mixed in the following way: pigments were initially mixed with the resin components until uniform, then the filler was added and the final composition was mixed until uniform.

Examples (Ex) and Comparative Examples (CE)
(Wt %)

| | EX1 | EX2 | EX3 | EX4 | EX5 | CE1 | CE2 |
| --- | --- | --- | --- | --- | --- | --- | --- |
| BisGMA | 3.9189 | 3.7126 | 3.3001 | 14.4383 | 3.3001 | | 10.5498 |
| BisEMA6 | 6.8671 | 6.4972 | 5.7752 | 1.0313 | 5.7752 | | |
| TEGDMA | 0.9798 | 0.9283 | 0.8250 | | 0.8250 | | |
| UDMA | 3.9189 | 3.7126 | 3.3001 | 1.0313 | 3.3001 | 12.9490 | |
| Procrylate | 3.9189 | 3.7126 | 3.3001 | | 3.3001 | 4.3160 | |
| CAPA2125-IEM | 1.0226 | 2.0629 | 4.1257 | 4.1257 | | | |
| CAPA2205-IEM | | | | | | 4.3160 | |
| CAPA2200A-IEM | | | | | 4.1257 | | |
| Tone 230-IEM | | | | | | | 9.0960 |
| TPEG990 | | | | | | | 0.6000 |
| SiO$_2$/ZrO$_2$ nanocluster | 55.7979 | 55.7979 | 55.7979 | 57.2451 | 55.7979 | 44.6400 | |
| 20 nm Silica Nanomer | 19.5497 | 19.5497 | 19.5497 | 19.0817 | 19.5497 | 29.7600 | |
| Cabosil M5 | 3.1392 | 3.1392 | 3.1392 | 2.1600 | 3.1392 | 3.0890 | 2.1698 |
| S/T Filler | | | | | | | 76.7302 |
| Red Pigment Dispersion | 0.0100 | 0.0100 | 0.0100 | 0.0100 | 0.0100 | 0.0040 | 0.0117 |
| White Pigment Dispersion | | | | | | 0.0400 | 0.1065 |
| Black Pigment Dispersion | | | | | | 0.0040 | 0.0002 |
| Yellow Pigment Dispersion | 0.0430 | 0.0430 | 0.0430 | 0.0430 | 0.0430 | 0.0480 | 0.0613 |
| CPQ | 0.0610 | 0.0610 | 0.0610 | 0.0610 | 0.0610 | 0.0610 | 0.0345 |
| EDMAB | 0.2240 | 0.2240 | 0.2240 | 0.2240 | 0.2240 | 0.2240 | 0.2032 |
| DPIHFP | 0.1790 | 0.1790 | 0.1790 | 0.1790 | 0.1790 | 0.1790 | 0.1016 |
| BHT | 0.0340 | 0.0340 | 0.0340 | 0.0340 | 0.0340 | 0.0340 | 0.0305 |
| Tinuvin R 976 | 0.3360 | 0.3360 | 0.3360 | 0.3360 | 0.3360 | 0.3360 | 0.3048 |

Flexural Strength Test
Test Method:
Flexural Strength was tested by following the procedure described in International Standard ISO 4049-2009, entitled "Dentistry—Polymer-based filling, restorative and luting materials".

| Material | Flexural Strength MPa | Standard Deviation | Flexural Modulus MPa | Standard Deviation |
|---|---|---|---|---|
| Example 3 | 125.7 | 11.0 | 9177 | 1239 |
| Example 4 | 110.8 | 27.4 | 9647 | 1057 |
| CE-1 | 124.3 | 11.0 | 9341 | 896 |
| CE-2 | 113.9 | 12.8 | 6204 | 723 |

Watts Shrinkage Test

The Watts Shrinkage (Watts) Test Method measures shrinkage of a test sample in terms of volumetric change after curing. The sample preparation (90-mg uncured composite test sample) and test procedure were carried out as described in the following reference: Determination of Polymerization Shrinkage Kinetics in Visible-Light-Cured Materials: Methods Development, Dental Materials, October 1991, pages 281-286. Results in terms of percent shrinkage were reported as the average of three replicates for each sample as follows:

| Material | Total Shrinkage % |
|---|---|
| EX1 | 2.14 |
| EX2 | 2.08 |
| EX3 | 2.11 |
| EX4 | 1.55 |
| CE-1 | 2.07 |
| CE-2 | 1.65 |

Staining Test
Staining Disk Preparation

Samples (approximately 10 grams) of the dental compositions were pressed to a thickness of approximately 1.1 millimeters (between 2 pieces of silicone release paper), using a hydraulic press (available from Carver Inc., Wabash, Ind.) at approximately 60° C. Each pressed sample was then stored at room temperature for 7 days, after which a 14 mm diameter disc was cut and placed in a 1 mm thick by 15 mm diameter split mold, sandwiched between 2 pieces of 1 mil polyester film available from DuPont under the trade designation "Mylar". This was then placed between 2 steel plates, and pressed in the above hydraulic press at 37° C. for 2 minutes under 1000 psi (6.9×10$^6$ Pa). The polyester film sandwiched sample was then taken out of the hydraulic press, covered with a 1 mm thick, 50 mm×75 mm glass microscope slide (VWR Catalog #374-1407) over the polyester film, and light cured for 50 seconds by using VISILUX Model 2500 dental curing light (3M ESPE). After that, the other side was also cured for 50 seconds through a glass microscope slide. With the polyester films still present, the dental composite disc was conditioned in a 37° C. oven for 15 minutes. This sample disc was then stored in 37° C. deionized water before staining test.

Coffee Solution

A 15% coffee solution was prepared by adding 15 g of Folgers Classic Roast Instant Coffee Crystals to 85 g of 80° C. de-ionized water, mixing well, and then letting it cool down to 37° C. or less. (coffee crystals commercially available from The Folger Coffee Company, Cincinnati, Ohio 45202).

Two discs were used from each formulation for the staining test. The CIELAB color of each disc was measured before the staining test as follows. A spectrophotometer obtained from HunterLab, Reston, Va. under the trade designation "UltraScan XE" in small area view mode with RSIN (reflectance specular included) was used to measure the L*, a*, and b* values. After the initial color measurements, the dental composite discs were placed in 15% coffee solution at 37° C. for 3 days. The stained discs were then rinsed with de-ionized water, and the color of the stained discs was measured again. The staining resistance is reported as Delta E* as defined below:

$$\text{Delta } E^* = [(L_0^* - L_1^*)^2 + (a_0^* - a_1^*)^2 + (b_0^* - b_1^*)^2]^{1/2}$$

wherein each 0 represents the initial values and each 1 represents the values after conditioning the hardened dental composition in the indicated test solution.

The test results are as follows:

| Staining - 15% coffee staining data (37° C./3 days) | | |
|---|---|---|
| Materials | Delta E* | Standard Deviation |
| EX1 | 5.50 | 0.17 |
| EX2 | 5.37 | 0.41 |
| EX3 | 6.15 | 0.01 |
| EX4 | 6.72 | 0.83 |
| CE-1 | 8.61 | 0.78 |
| CE-2 | 12.76 | 1.37 |

Crown Formation and Handling Assessment

Crowns were prepared by a two-stage process, analogous to that described in patent application US2005/100868. Samples of each paste to be tested were injected into a cavity lined with an ethylene-vinyl acetate (EVA) copolymer film, containing ~19% vinyl acetate. This sample of paste was transferred to a second multi-part mold, covered with a second polyethylene film, and compression molded to form a hollow crown shape. This mold was in the form of a symmetric model lower first molar. The resulting formed crown had a mesial-distal dimension of approximately 10.6 mm.

The above prepared crowns were conditioned/aged at different Temperature/Humidity environment to mimic storage condition change with the season, including a 23° C./15% RH dry environment.

The materials were evaluated by an experienced dentist customizing the crowns formed of the materials on a prepared artificial tooth in a Columbia Dentoform R862 Typodont, at the #31 position. The Typodont tooth was modified to have a shoulder preparation. The crown was wet with water, manipulated by hand to obtain an initial assessment of the handling, and adapted to the preparation in the Typodont. Overall acceptability of the handling was assessed based on ability to trim, adjust, and smooth the crown before cure.

After 2 weeks of aging at 23° C./15% RH dry environment, the crown handling results are shown in the forthcoming table.

3 Body Wear

Samples were compared with Comparative Example 2 (CE2) in 3-body wear testing generally according to the ACTA method described by P. Pallav, C. L. Davidson, and A. J. DeGee in *J Pros Dent* 59 (1988) (4), pp. 426-429. The procedure was modified by excluding sodium azide from the wear media, and by preparing the wear wheel initially by machining rather than grinding on the ACTA-wear machine. Wear rate was measured by measuring the wear depth at 6 intervals, fitting a line by the least-squares method, and generating the ratio of each material's slope to the slope of CE2. Results of this experiment are summarized in the following table:

Wear and Handling

| | Wear Ratio to CE2 | Standard deviation | Handling Assessment |
|---|---|---|---|
| EX1 | 0.34 | 0.06 | Good |
| EX2 | 0.36 | 0.01 | Good |
| EX3 | 0.36 | 0.08 | Good |
| EX4 | 0.45 | 0.13 | Good |
| EX5 | Not Tested | Not Tested | Good |
| CE1 | 0.24 | 0.05 | Poor |
| CE2 | 1.00 | 0.06 | Good |

Preparation of Dental Margin Article

Light curable composite paste (60 grams), prepared substantially as described in Example 3 of U.S. Pat. No. 8,906,981 (Yang et al.), was loaded into a 610 mL (20 oz.) plastic Semco® cartridge (available from PPG Industries, Sylmar Calif.) equipped with a nozzle including a rectangular orifice, the orifice having dimensions of 0.038 inches× 0.188 inches (0.96 mm×4.78 mm). After heating the composite-loaded cartridge to 60° C. for 30 minutes, the heated composite was extruded through the rectangular orifice under 2,500 pounds of force (1,100 kg) to provide a ribbon-like composite strip. The composite strip was allowed to cool to room temperature prior to further use. In a similar fashion, light curable composite ropes were prepared by extruding the heated composite through a nozzle including a circular orifice having a 0.086 inch (2.18 mm) diameter. The composite strips and ropes could be easily cut and/or (re)shaped.

Use of Dental Margin Article with Composite Crown

A typodont tooth (lower left $2^{nd}$ molar) available from Columbia Dentoform (Long Island City, N.Y.) was prepared with a conventional shoulder preparation, analogously to that illustrated in FIG. 4b.

To mimic a typical commercially available prefabricated composite crown, a light curable composite crown (DIRECTLY PLACED CROWN, available from 3M Oral Care, Japan) was used. The manufacturer's instructions were generally followed, except for the crown marginal adaptation and cementation steps. Briefly, an appropriately sized light curable crown was selected (small lower molar size). The light curable composite crown was gently rolled between the fingers to pre-warm the crown (such as to improve malleability) and straighten the axial walls. The proper height of the crown was determined by measuring the height of the adjacent typodont tooth. A shallow "V" shape was cut into the distal and mesial margins of the light curable crown to establish the proper height. Excess material was trimmed away with a scissors so as to follow the gingival contour to establish the proper crown height (verified by placing the trimmed crown on the prepared typodont tooth). The light curable crown was tack cured using an ELIPAR S-10 curing light (3M Oral Care) for 2-3 seconds at each of the buccal, lingual, and occlusal surfaces. The partially cured crown was removed from the tooth preparation and fully cured by exposing all surfaces of the crown to the curing light for 60 seconds, curing the outside surfaces of the crown prior to curing the inside of the crown. Then, the fully cured composite crown was test-fitted back on to the typodont tooth preparation. The composite crown had a clear marginal gap when placed on to the prepared typodont tooth.

The prepared typodont tooth was etched with a phosphoric acid etchant (SCOTCHBOND ETCHANT, available from 3M Oral Care, St. Paul, Minn.) according to the manufacturer's instructions. An adhesive (SCOTCHBOND UNIVERSAL ADHESIVE, available from 3M Oral Care) was applied to the etched tooth and light cured with an ELIPAR S-10 curing light according to the manufacturer's instructions. A length of the composite strip previously described was then applied circumferentially to the prepared tooth at the marginal area using a dental composite scaler (THOMPSON COMPOSITE TD12X, available from Miltex Inc., York, Pa.) to seat the composite strip, analogously to that illustrated in FIG. 4b.

Next, a dual curing cement (RELYX UNICEM 2, available from 3M Oral Care) was applied to the inner surface of the light-cured composite crown, according to the manufacturer's instructions. The light-cured composite crown was then placed onto the prepared tooth and the upper and lower arches of the typodont where closed with hand pressure to fully seat the crown (analogously to that illustrated in FIG. 4c). Excess cement and excess composite strip material were removed with the dental composite scaler. The remaining composite strip material (which sealed the marginal gap) was smoothed with the scaler. The assembly was light cured for 20 seconds to cure the composite strip, as well as the cement. The cemented crown displayed a good marginal seal, with the cured composite strip filling in unwanted gaps, analogously to that illustrated in FIG. 4d.

Use of Dental Margin Article with Zirconia Crown

A pediatric typodont tooth (lower left $1^{st}$ molar) available from Columbia Dentoform was prepared with a conventional shoulder preparation, analogously to that illustrated in FIG. 1. A prefabricated pediatric zirconia crown (EZ-PEDO, $1^{st}$ molar, size S3 available from EZ-Pedo, Inc., Loomis, Calif.) was test fitted to the prepared typodont tooth. The prefabricated zirconia crown had an undesirable marginal gap when placed on to the prepared typodont tooth.

The prepared typodont tooth was etched with a phosphoric acid etchant (SCOTCHBOND ETCHANT) according to the manufacturer's instructions. An adhesive (SCOTCHBOND UNIVERSAL ADHESIVE) was applied to the etched tooth and light cured with an ELIPAR S-10 curing light according to the manufacturer's instructions. A length of the composite strip (prepared as previously described) was then applied circumferentially to the prepared tooth at the marginal area using a dental composite scaler (THOMPSON COMPOSITE TD12X) to seat the composite strip, analogously to that illustrated in FIG. 4b.

Next, a resin-modified glass ionomer cement (RELYX LUTING PLUS, available from 3M Oral Care) was applied to the inner surface of the zirconia crown, according to the manufacturer's instructions. The zirconia crown was then placed onto the prepared tooth and the upper and lower arches of the typodont where closed with hand pressure to fully seat the crown (analogously to that illustrated in FIG. 4c). Excess cement and excess composite strip material were removed with the dental composite scaler. The remaining composite strip material (which sealed the marginal gap) was smoothed with the scaler. The assembly was light cured for 20 seconds to cure the composite strip. The cemented zirconia crown displayed a good marginal seal, with the cured composite strip filling in unwanted gaps, analogously to that illustrated in FIG. 4d.

The materials of Examples 1-2 and 4-5 can be prepared into dental margin articles in the same manner as Example 3 and be utilized for placing a preformed (e.g. crown) dental article and repair of a dental restoration as described herein.

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A method of placing a preformed dental article on a tooth structure, the method comprising:
    providing a preformed dental article;
    providing an uncured self-supporting dental article having a rope, ribbon, or annular shape,
        the uncured self-supporting dental article comprising:
            a polymerizable resin system, and
            at least 50 wt-% of filler;
    placing the preformed dental article onto a tooth structure;
    placing the uncured self-supporting dental article onto the tooth structure such that the uncured self-supporting dental article circumferentially surrounds the base of the tooth structure to form a ring shape; and
    forming the uncured self-supporting dental article effective to one or more of:
        fill a void between the tooth structure and the preformed dental article, and
        fill a void between a gumline and the preformed dental article.

2. The method of claim 1, further comprising bonding the preformed dental article and uncured self-supporting dental article to the tooth structure prior to or after forming the uncured self-supporting dental article.

3. The method of claim 2, further comprising etching the tooth structure prior to bonding.

4. The method of claim 2, further comprising hardening the uncured self-supporting dental article by curing prior to or after bonding.

5. The method of claim 1, wherein the forming of the uncured self-supporting dental article comprises or more of:
    removing any excess uncured dental material, and
    manipulating the shape of the uncured dental material in order to form a continuous surface between the preformed dental article and the tooth structure.

6. The method of claim 1, wherein the preformed dental article is a crown.

7. The method of claim 1, wherein the preformed dental article comprises an uncured material, the method further comprising concurrently curing the preformed dental article and uncured self-supporting dental article.

8. The method of claim 1, wherein the preformed dental article comprises a hardened uncurable material.

9. The method of claim 1, wherein the tooth structure is of a typodont model.

10. The method of claim rope, ribbon, or annulus has a thickness ranging from 0.5 to 2 mm.

11. The method of claim 1, wherein the ribbon, or annulus has a cross-sectional shape selected from circular, oval, rectangular, U-shaped or trapezoidal.

12. The method of claim 11, the cross-sectional shape having a width ranging from 2 mm to 5 mm.

13. The method of claim 1, wherein the rope, ribbon, or annulus has a length of at least 5 mm.

14. The method of claim 1, wherein the polymerizable resin system comprises ethylenically unsaturated monomers.

15. A method of repairing a dental restoration of a tooth structure comprising:
    providing an uncured self-supporting dental article having a rope, ribbon, or annulus shape;
        the uncured self-supporting dental article having a first shape and comprising:
            a polymerizable resin system;
            at least 50 wt-% of filler; and
    placing the uncured self-supporting dental article onto the tooth structure proximate the dental restoration,
    forming the uncured self-supporting dental article effective to on or more of:
        fill a void between the tooth structure and dental restoration, and
        fill a void between a gumline and the preformed dental article.

16. The method of claim 15, further comprising bonding the uncured self-supporting dental article to the tooth structure prior to or after the forming.

17. The method of claim 15, further comprising hardening the uncured self-supporting dental article by curing after the forming.

* * * * *

UNITED STATES PATENT AND TRADEMARK OFFICE
CERTIFICATE OF CORRECTION

PATENT NO. : 11,129,693 B2
APPLICATION NO. : 16/327214
DATED : September 28, 2021
INVENTOR(S) : Jie Yang It is certified that error appears in the above-identified patent and that said Letters Patent is hereby corrected as shown below:

In the Claims

<u>Column 25</u>
Line 43, In Claim 5, delete "or more" and insert -- one or more --, therefor.

<u>Column 26</u>
Line 12, In Claim 10, delete "claim" and insert -- claim 1, wherein the --.
Line 14, In Claim 11, after "wherein the", insert -- rope --.

Signed and Sealed this
Tenth Day of January, 2023

Katherine Kelly Vidal
*Director of the United States Patent and Trademark Office*